United States Patent [19]

Brenton et al.

[11] Patent Number: 4,499,640

[45] Date of Patent: Feb. 19, 1985

[54] METHOD OF MANUFACTURING CAPACITANCE-TYPE MATERIAL LEVEL INDICATOR PROBE

[75] Inventors: Ronald G. Brenton, Marysville, Mich.; Robin B. Runck, Sherman Oaks, Calif.

[73] Assignee: Berwind Corporation, Philadelphia, Pa.

[21] Appl. No.: 411,524

[22] Filed: Aug. 25, 1982

[51] Int. Cl.³ ............................................. H01G 5/00
[52] U.S. Cl. .................................. 29/25.41; 29/825; 29/883; 73/304 C; 264/262; 264/272.13; 264/272.15; 324/61 P
[58] Field of Search ............... 29/592, 825, 25.41, 29/883; 264/262, 272.11, 272.13, 272.15; 73/304 R, 304 C; 324/61 P; 340/620; 174/107; 361/284, 303, 280

[56] References Cited

U.S. PATENT DOCUMENTS

| | | | |
|---|---|---|---|
| 2,444,997 | 7/1948 | Lovesey | 29/883 |
| 2,852,937 | 9/1958 | Maze | 73/304 C |
| 2,955,466 | 10/1960 | Coles | 73/304 C X |
| 3,119,266 | 1/1964 | Atkinson | 73/304 R |
| 3,339,411 | 9/1967 | Riffie | 73/304 R |
| 3,879,644 | 4/1975 | Maltby | 361/272 |
| 3,988,668 | 10/1976 | Bowers | 324/61 P |
| 4,025,846 | 5/1977 | Franz et al. | 324/61 P |
| 4,178,623 | 12/1979 | Emmerich et al. | 361/284 |

FOREIGN PATENT DOCUMENTS 1275777 8/1968 Fed. Rep. of Germany .

Primary Examiner—Carl E. Hall
Attorney, Agent, or Firm—Barnes, Kisselle, Raisch, Choate, Whittemore & Hulbert

[57] ABSTRACT

A system and probe for indicating the level of material in a vessel as a function of material capacitance comprising a resonant circuit including a capacitance probe adapted to be disposed in a vessel so as to be responsive to variations in capacitance as a function of material level. An rf oscillator has an output coupled to the resonant circuit and to a phase detector for detecting variations in phase angle as a function of probe capacitance. Level detection circuitry is responsive to an output of the phase detector and to a reference signal indicative of a predetermined level of material for indicating material level as a function of a difference between capacitance at the probe and the reference signal. In the preferred embodiments of the invention disclosed, an automatic calibration circuit adjusts the resonance characteristics of the parallel resonant circuit of the reference signal indicative of a predetermined reference material level.

2 Claims, 6 Drawing Figures

FIG. I

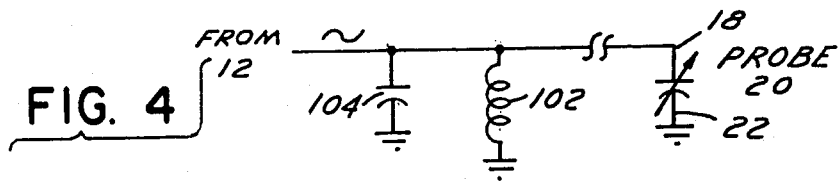
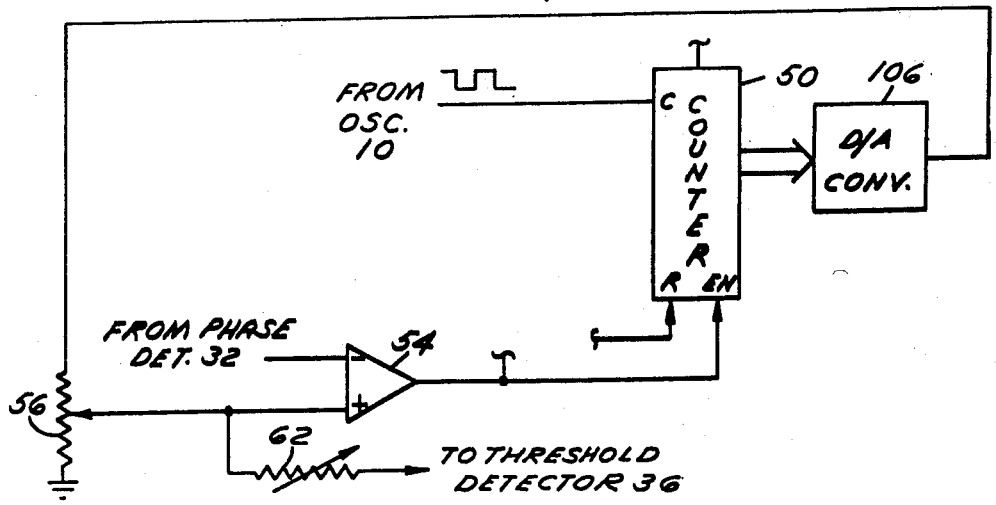
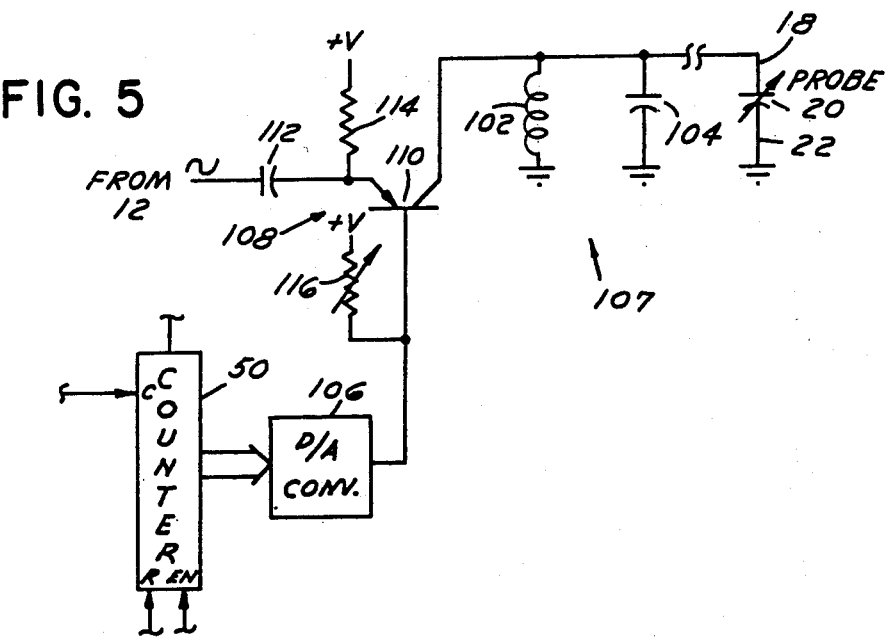

METHOD OF MANUFACTURING CAPACITANCE-TYPE MATERIAL LEVEL INDICATOR PROBE

The present invention is directed to systems for indicating the level of material in a storage vessel or the like, and more particularly to an improved system of the described type for indicating material level as a function of material capacitance. The present invention also relates to a capacitance material sensing probe and to a method for manufacture thereof.

OBJECTS AND SUMMARY OF THE INVENTION

A general object of the present invention is to provide a system for indicating the level of material in a storage vessel or the like which is inexpensive in manufacture and reliable in operation over a substantial operating lifetime and in a variety of operating environments.

Another and more specific object of the present invention is to provide a material level indicating system of the described type which may be readily calibrated in the field by relatively unskilled personnel for a variety of applications and environments. A related object of the invention is to provide such a system to include facility for rapid and automatic recalibration in the field by an unskilled operator.

A further object of the invention is to provide a capacitance-type material level indicating system with reduced sensitivity to the effects of material coating on the capacitance probe and/or to the effects of conductivity or variation in conductivity of the sensed material.

Yet another object of the present invention is to provide an improved capacitance sensing probe for application in material level indicating systems, and an inexpensive method for manufacture of such a probe.

Briefly stated, the present invention contemplates a system for indicating the level of material in a vessel as a function of material capacitance comprising a resonant circuit including a capacitance probe adapted to be disposed in a vessel so as to be responsive to variations in capacitance as a function of material level in the vessel, an oscillator having an output coupled to the resonant circuit including the capacitance probe, a phase detector responsive to variations in phase angle at the oscillator output as a function of probe capacitance, a calibration circuit for identifying a reference capacitance indicative of a predetermined level of material in the vessel, and an output circuit responsive to the phase detector and calibration circuit for indicating material level in the vessel as a function of a difference between capacitance at the probe and the reference capacitance. The calibration circuit includes a comparator having a first input responsive to the phase detector and a second input indicative of the reference capacitance. Operating characteristics of the system are varied during a calibration operation to obtain a predetermined comparison at the comparator, preferably substantially at resonance of the resonance circuit. Most preferably, the calibration circuit operates automatically upon initiation of a calibration operation to vary system characteristics, such as, the resonance characteristics of the resonant circuit on the reference input to the comparator, to obtain the desired predetermined operation substantially at resonance.

BRIEF DESCRIPTION OF THE DRAWINGS

The invention, together with additional objects, features and advantages thereof, will be best understood from the following description, the appended claims and the accompanying drawings in which:

FIGS. 4 and 5 are electrical schematic diagrams of respective alternative embodiments to the preferred embodiment as illustrated in detail in FIG. 2.

DETAILED DESCRIPTION OF PREFERRED EMBODIMENTS

Figure 1:
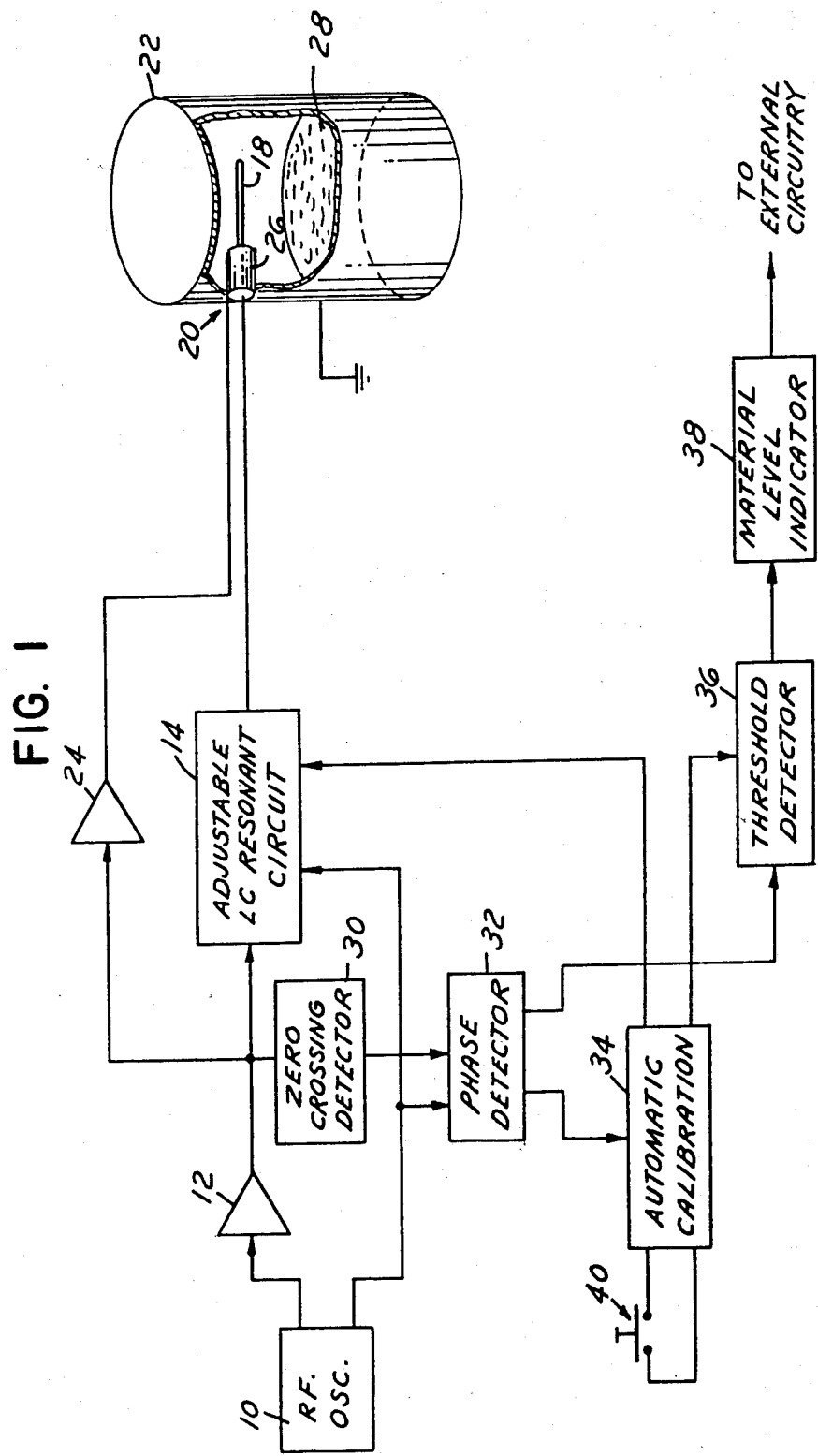
FIG. 1 is a functional block diagram of a presently preferred embodiment of a capacitance-type material level indicating system in accordance with the invention.

FIG. 1 illustrates a presently preferred embodiment of the material level indicating system of the invention as comprising an rf oscillator 10 which provides a periodic signal at a first output to a phase shift (90°) amplifier 12. The sinusoidal output of amplifier 12 is connected to an adjustable parallel LC resonant circuit 14. Resonant circuit 14 is connected to the probe conductor 18 of a probe assembly 20 (FIGS. 1 and 6) mounted in the side wall of a storage vessel 22. The output of amplifier 12 is also connected through a unity gain amplifier 24 having low output impedance to the guard shield 26 of probe assembly 20. The wall of vessel 22, which may be a storage bin for solid materials or a liquid storage tank, is connected to ground. As is well-known in the art, the capacitance between probe conductor 18 and the grounded wall of vessel 22 varies with the level of the material 28 stored therein and with material dielectric constant. This variation in the capacitance is sensed by the remainder of the system electronics to be described and provides the desired indication of material level. Guard shield 26, which is energized by amplifier 24 at substantially the same voltage and phase as probe conductor 18, functions to prevent leakage of probe energy through material coated onto the probe surface, and thus to direct probe radiation outwardly into the vessel volume so as to be more closely responsive to the level of material stored therein.

The sinusoidal output of amplifier 12 is fed through a zero crossing detector 30 to one input of a phase detector 32. Phase detector 32 receives a square wave second input from a second output of oscillator 10 180° out of phase with the oscillator output directed to amplifier 12. A first output of phase detector 32, which is a d.c. signal at a level proportional to the phase relationship between the respective inputs, and thus responsive to variations in phase angle of the oscillator probe drive output due to changes in probe capacitance, is fed to an automatic calibration circuit 34. A second output of phase detector 32, which is also d.c. signal indicative of input phase relationship, is directed to one input of a threshold detector 36. The outputs of phase detector 32 are identical but effectively isolated from each other for reasons that will become apparent. Automatic calibration circuit 34 provides a control input to adjustable LC resonant circuit 14 which receives a second input for adjustment purposes from oscillator 10. Calibration circuit 34 also provides a reference input to threshold detector 36. The output of threshold detector 36 is fed through material level indicating circuitry 38 to external circuitry for controlling and/or indicating vessel material level as desired.

In general, automatic calibration circuitry 34 functions to adjust the resonance characteristics of resonant circuit 14 during a calibration mode of operation initiated by an operator push-button 40 connected thereto so as to establish, in effect, a reference capacitance level indicative of a preselected material condition in vessel 22 which exists during the automatic calibration mode. Preferably, the level of material in vessel 22 is first raised (by means not shown) to the level of probe assembly 20 and then lowered so as to be spaced from the probe assembly. If material 28 is of a type which coats the probe assembly, such coating will remain on the probe and be taken into consideration during the ensuing calibration operation. With the material level lowered, an operator may push button 40 to initiate the automatic calibration mode of operation. The resonance characteristics of circuit 14 are then automatically varied or adjusted by calibration circuit 34 until the output of phase detector 32 indicates that the return signal from the parallel combination of resonant circuit 14 and capacitance probe 20 bears a preselected phase relationship to the oscillator reference input to phase detector 32, which phase relationship thus corresponds to an effective reference capacitance level at calibration circuit 34 indicative of a low material level.

Thereafter, during the normal operating mode, the output of phase detector 32 is compared in threshold detector 36 to a reference input from calibration circuit 34 indicative of the reference capacitance level, and threshold detector 34 provides an output to material level indicating circuitry 38 when the sensed material capacitance exceeds the reference capacitance level by a predetermined amount which is selected as a function of material dielectric constant. If probe 20 is placed in the upper portion of vessel 22 as shown in FIG. 1, such proximity would normally indicate a full tank condition. If, on the other hand, probe 20 is disposed in the lower portion of tank 22, material would normally be in proximity to the probe assembly, and indeed would normally cover the probe assembly, so that absence of such proximity would indicate an empty tank condition.

Figure 2:
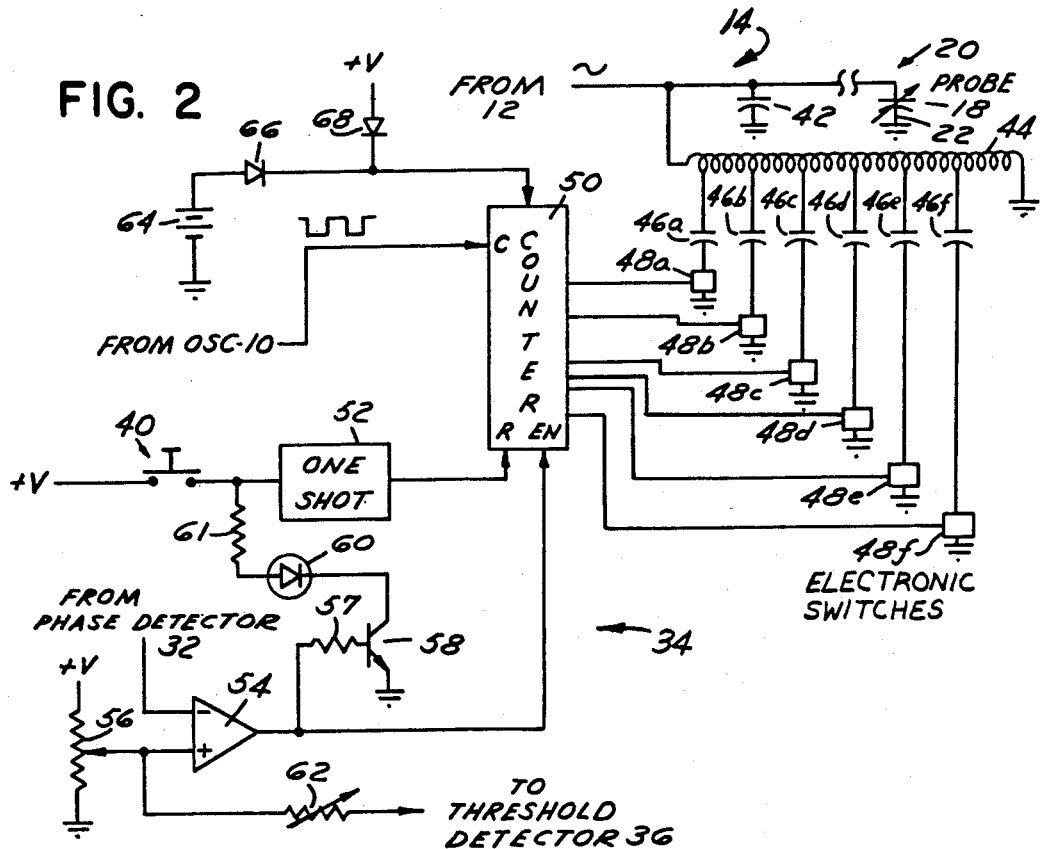
FIGS. 2 and 3 are electrical schematic diagrams of respective portions of the system illustrated in functional form in FIG. 1.

FIG. 2 illustrates a presently preferred embodiment of automatic calibration circuitry 34 and adjustable LC resonant circuit 14. Resonant circuit 14 includes a fixed capacitor 42 and an inductance 44 connected in parallel with probe conductor 18 across the output of amplifier 12, i.e. between the amplifier output and ground. Inductance 44 comprises a plurality of inductor coils or windings having a number of connection taps at electrically spaced positions among the inductor coil turns. A plurality of fixed capacitors 46a–46f are each electrically connected in series with a respective controlled electronic switch 48a–48f between a corresponding connection tap on inductance coil 44 and electrical ground. Switches 48a–48f may comprise any suitable electronic switches and are normally open in the absence of a control input. A digital counter 50 receives a count input from oscillator 10 and provides a plurality of parallel digital outputs each indicative of a corresponding bit of the count stored in counter 50. Each data bit output of counter 50 is connected to control a corresponding electronic switch 48a–48f for selectively connecting or disconnecting the corresponding capacitor 46a–46f in resonant circuit 14 as a function of the state of the counter output bit.

Most preferably, and in accordance with an important feature of the preferred embodiment illustrated in the invention of FIG. 2, the capacitance values of capacitors 46a–46f and the number of coil turns separating the connection taps of inductance 44 are selected such that the effective capacitance added to the parallel LC resonant circuit 14 by each capacitor 46a–46f corresponds to the numerical significance of the corresponding counter output. That is, assuming that counter 50 is a binary counter with outputs connected to switches 48a–48f in reverse order of significance, the values of capacitors 46e, 46f and the number of turns at inductance 44 therebetween are selected such that the effective capacitance connected in parallel with fixed capacitor 42 and probe 20 is twice as much when switch 48e only is closed as when switch 48f only is closed. Likewise, the effective capacitance added by switch 48a and capacitor 46a is thirty-two times the effective value of capacitor 46f and switch 48f. It will be appreciated that inductance 44 functions as an autotransformer so as to establish the effective capacitance of each capacitor 46 as a function of the corresponding connection point among the inductance coils. It will also be appreciated that the number of inductance connection taps may be less than the number of capacitors 46a–46f, with two or more capacitors connected to one tap. The values of capacitor connected to a common tap should differ by multiples of approximately two in correspondence with the significance of the control bits from counter 50.

Figure 3:
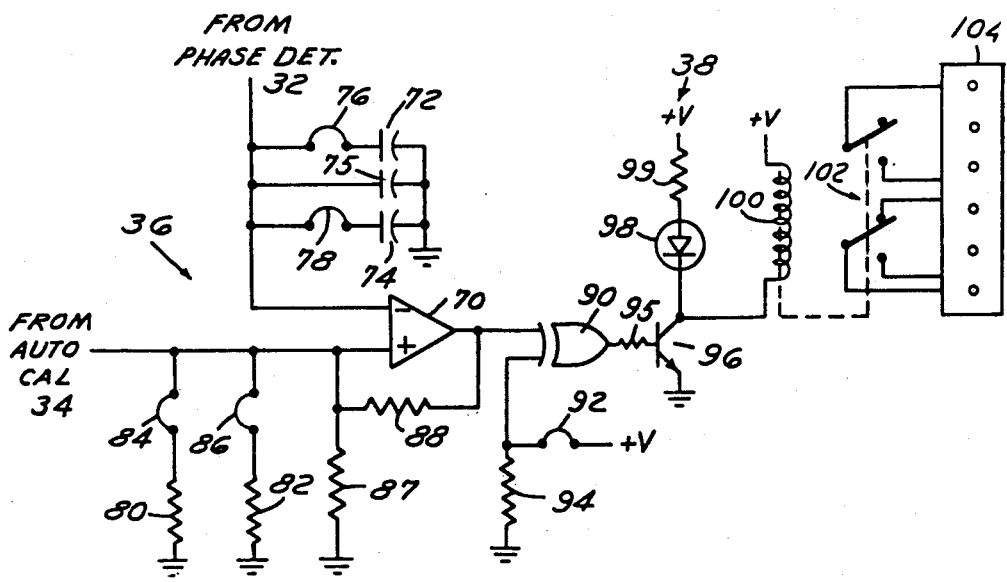

Automatic calibration circuit 34 illustrated in FIG. 2 includes a one shot 52 which receives an input from operator push-button 40 and provides an output to the reset input of counter 50 in resonant circuit 14 to initiate the automatic calibration mode of operation. A differential comparator 54 has an inverting input connected to the output of phase detector 32 and a non-inverting input connected to the wiper of a variable resistor 56. Resistor 56 is connected across a source d.c. potential. The output of comparator 54 is connected to the enabling input of counter 50 in resonant circuit 14. The output of comparator 54 is also connected through a resistor 57 to the base of an NPN transistor 58 which functions as an electronic switch having primary collector and emitter electrodes connected in series with an LED 60, a resistor 61 and operator switch 40 across a source of d.c. potential. The non-inverting input of comparator 54 is also connected through an adjustable resistor 62 to threshold detector 36 (FIGS. 1 and 3).

Depression of switch 40 by an operator initiates the automatic calibration procedure by clearing or resetting counter 50. All capacitors 46 are disconnected from resonant circuit 14. With material coated on the probe, circuit operation is substantially removed from resonance on the "inductive" side, and the output from phase detector 32 to comparator 54 is high. Differential comparator 54 thus provides a low output to the enabling input of counter 50 and to the base of transistor 58, so that transistor 58 is biased for non-conduction and deenergizes LED 60. With counter 50 so reset and enabled, the pulsed counter input from oscillator 10 advances the count in counter 50, and thereby sequentially and selectively connects the various capacitors 46a–46f into the parallel LC resonant circuit as controlled by switches 48a–48f. As previously indicated, the effective capacitance added by connection of each capacitor is directly related and proportional to the numerical significance of the corresponding bit in counter 50.

As capacitors 46 are added in parallel connection with inductance 44, capacitor 42 and probe 20, and as the parallel combination approaches resonance at the frequency of oscillator 10, the output of phase detector 32 decreases toward the reference level determined by the setting of variable resistor 56 at the non-inverting input of differential comparator 54. Resistor 56 is preferably factory set to correspond with a resonance condition at circuit 14 for a low-level or "empty-vessel" nominal capacitance with no coating on probe 20 and all capacitors 46a–46f in circuit. The empty-tank capacitance at probe 20 may be 15 picofarads, for example. When the output of phase detector 32 reaches this reference capacitance level input to comparator 54, which is preferably at substantially the resonance condition of the LC resonant circuit, the output of differential amplifier 54 switches to a high or one logic stage. Further operation of counter 50 is inhibited and LED 60 is illuminated through transistor 58 so as to indicate to an operator that the calibration operation has been completed. The operator may then release switch 40. Thus, the resonance circuit is designed to be at resonance with all capacitors 46a–46f in circuit and the probe uncoated. The automatic calibration operation functions to delete one or more capacitors 46a–46f from the parallel resonance circuit to compensate for the coating on the probe, cable capacitance, tank geometry, parasitic capacitance, and variations in probe insertion length and circuit operating characteristics.

All of the circuitry hereinabove (and hereinafter) described receive input power from a suitable power supply (not shown) energized by a utility power source. Preferably, adjustable LC resonant circuit 14 further includes a battery 64 connected by the blocking diodes 66, 68 in parallel with the power supply d.c. voltage to the power input terminal of counter 50 so as to maintain the calibration count therein in the event of power failure.

Referring now to FIG. 3, threshold detector 36 includes a differential comparator 70 having an inverting input connected to the second output of phase detector 32 (FIG. 1) and a non-inverting input connected through adjustable resistor 62 (FIG. 2) to reference-indicating adjustable resistor 56. A pair of capacitors 72, 74 are connected through corresponding jumpers 76, 78 between the inverting input of comparator 70 and ground. A third capacitor 75 is also connected between the inverting input of comparator 70 and ground. Capacitors 72, 74, 75 and jumpers 76, 78 provide a factory-selectable or field-selectable adjustable delay in operation of threshold detector 36 so that a transient condition will not result in an erroneous indication of change of material level. The phase detector outputs are isolated as previously described so that delay capacitors 72, 74, 75 will not affect operation in the calibration mode. A pair of resistors 80, 82 are connected by corresponding jumpers 84, 86 between the non-inverting input of comparator 70 and ground. A third resistor 87 is directly connected between the non-inverting comparator input and ground. Resistors 80, 82, 87 and jumpers 84, 86 cooperate with resistor 62 (FIG. 2) to provide factory or field selectable adjustment of the capacitance differential sensed by threshold detector 36 between the reference set by resistor 56 (FIG. 2) and the material-proximate material level which probe 20 is intended to indicate.

More specifically, with probe assembly 20 mounted in the upper portion of vessel 22 as illustrated in FIG. 1, the difference between the capacitance level at probe 20 corresponding to the reference level of resistor 56 with the material at low level and a full-tank capacitance is the capacitance increase caused by rise in material level into proximity with the capacitance probe. Resistors 80, 82, 87 and jumpers 80, 84 effectively select the capacitance differential to be sensed between low and high material level conditions. For a material of low dielectric constant such as cement, jumpers 84, 86 are removed and a threshold level corresponding to a capacitance differential of four picofarads, for example, is established by resistors 62, 87. For a material of medium dielectric constant such as acetone, jumper 84 may be added so that resistors 80, 87 in parallel establish a higher capacitance differential of eight picofarads, for example, corresponding to the same high material level. A still higher capacitance differential may be established with jumper 84 removed and jumper 86 intact. For materials of relatively high dielectric constant such as glycerine, both jumpers 84, 86 may remain intact, so that resistors 80, 82, 87 in parallel establish a maximum capacitance differential of twenty picofarads, for example.

When the output from phase detector 32 decreases from the empty tank near-resonance point established as a result of the automatic calibration operation previously described to a level established by resistors 56, 62, 80, 82 and/or 87, the output of differential comparator 70 switches from a low or logical zero level to a high or logical one level, thereby indicating proximity of material to the probe assembly. A resistor 88 is connected between the output of comparator 70 and the non-inverting input thereof to establish a hysteresis in comparator operation and thereby avoid intermittent switching of comparator output at a borderline material level condition. The output of differential comparator 70 is also connected in material level indicating circuitry 38 to one input of an exclusive-or gate 90. The second input of gate 90 is connected through a jumper 92 to the positive voltage supply and through a resistor 94 to ground. The output of gate 90 is connected through a resistor 95 to the base of an NPN transistor 96 which functions as an electronic switch to illuminate an LED 98 through a resistor 99 and to energize a relay coil 100 when the output of gate 90 assumes a high or logical one condition. The contacts 102 associated with relay coil 100 are connected to corresponding terminals of a terminal block 104 for connection to external circuitry as previously described.

Jumper 92 and resistor 94 cooperate with gate 90 for selecting either low level or high level fail safe operation of material level indicating circuitry 38. That is, jumper 92 and resistor 94 cooperate with gate 90 to de-energize relay coil 100 at either a high level condition (material proximate to probe 20) or a low level condition (material spaced from probe 20). In this way, the selected high level or low level condition will also be indicated to the external circuitry independently of actual material level in the event that relay coil 100 is de-energized by a power failure or the like. As previously indicated, the output of comparator 70 assumes a high or logical one voltage level when material 28 is in proximity to probe 20 (FIG. 1). If low level fail safe operation is desired, which means that relay 100 will de-energize to indicate a low material level, jumper 92 is removed so as to place a low or logical zero at the second input of gate 90. In this configuration, the output of gate 90 follows the first input from comparator 70 to illuminate LED 98 and energize relay coil 100 whenever material is in proximity to the capacitance probe, and to de-energize the LED and relay coil when material is spaced from the probe (low level). On the other hand, in high level fail safe operation with jumper 92 left intact, a high or logical one voltage level is placed at the second input of gate 90, so that the gate output is the inverse of the first input from comparator 70. LED 98 is thus illuminated and relay coil 100 energized when the level of material is remote from the sensor probe (low level) and de-energized when the material is in proximity to the probe (high level).

FIGS. 4 and 5 illustrate respective modifications to the preferred embodiment of the invention hereinabove described. Only the differences between the respective modifications and the preferred embodiment are illustrated in FIGS. 4 and 5 and described hereinafter. In the modification of FIG. 4, the adjustable LC resonant circuit of the preferred embodiment is replaced by a non-adjustable resonant circuit comprising a fixed capacitor 104 and a fixed inductor 102 connected in parallel with each other and with probe 20. Most preferably, capacitor 104 and inductor 102 are selected so as to exhibit resonance at the frequency of oscillator 10 in combination with an empty-tank capacitance at probe 20 (uncoated), such as fifteen picofarads for example. The bit-parallel data output of counter 50 is fed to a digital-to-analog converter 106 which provides an analog output voltage to reference resistor 56 in place of the fixed power supply voltage in the preferred embodiment of the invention previously described so as to vary the reference input voltage to comparator 54 as a function of the count in counter 50. Differential comparator 54 receives inputs from phase detector 30 and reference resistor 56, and terminates operation of the automatic calibration mode by removing the enabling input from counter 50 when the reference voltage supplied by resistor 56 to the inverting input of comparator 54 is equal to the output from phase detector 32 corresponding to the coated probe empty vessel calibration condition at probe 20. The corresponding count in counter 50 is held and the output of d/a converter 106 thereafter remains constant so as to provide an empty-tank reference voltage to threshold detector 36 as previously described. Thus, the reference level supplied by resistors 56, 62 to threshold detector 36 (FIGS. 1 and 3) in the modified calibration circuit of FIG. 4 indicates both empty-tank probe capacitance and any addition thereto caused by material coated on the probe and not effectively blocked by guard shield 26.

FIG. 5 illustrates a modified adjustable resonant circuit 107 which includes a source 108 of direct current controlled by the output of d/a converter 106 and connected to coil 102 for varying the effective inductance thereof as a function of the count in counter 50. Current source 108 includes a PNP transistor 110 having an emitter connected through a capacitor 112 to the output of amplifier 12 (FIG. 1) and through a resistor 114 to a positive d.c. voltage source. The base of transistor 110 is connected to the output of d/a converter 106 and through a resistor 116 to the voltage source. The collector of transistor 110 is connected to the parallel resonant circuit comprising inductor 102, capacitor 104 and probe 20. As the count in counter 50 increases during the automatic calibration mode, the direct current fed by transistor 110 to coil 102 decreases correspondingly, and thereby decreases the effective a.c. inductance of coil 102 to compensate for increased probe capacitance caused by material coating. When the effective inductance is decreased to a point where the parallel combination of capacitance 104, inductor 102 and coated probe 20 are substantially at resonance, operation of counter 50 is terminated by differential comparator 54 (FIG. 2) in the manner previously described. Resistor 116 may be variable for factory adjustment of current source gain.

Figure 6:
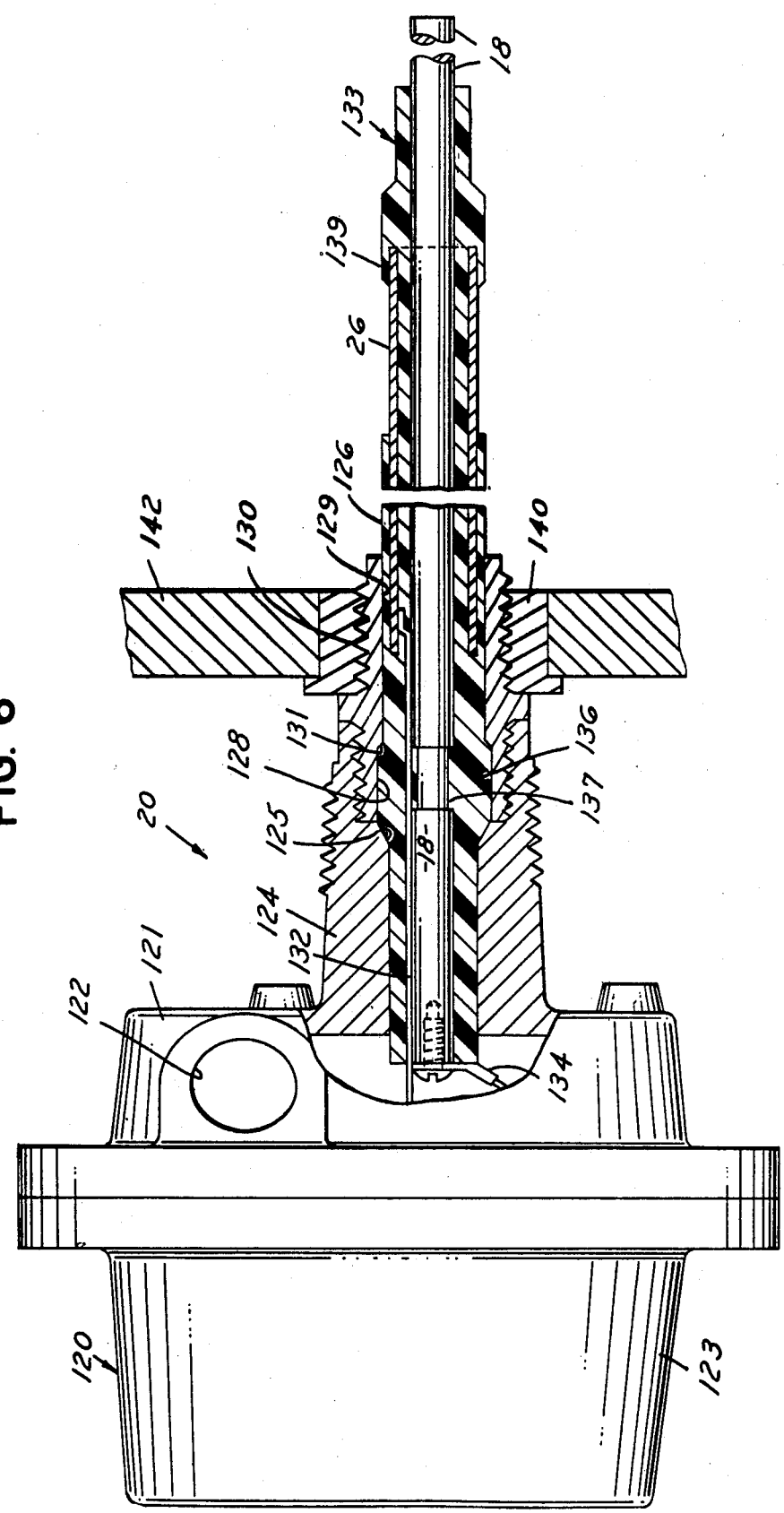
FIG. 6 is a partially sectional fragmentary elevational view of a capacitance sensing probe in accordance with a presently preferred embodiment of the invention.

FIG. 6 illustrates a presently preferred embodiment of probe assembly 20 in accordance with the invention as comprising a closed housing 120 in which all of the system electronics hereinabove described are preferably disposed. Housing 120 includes a conductor opening 122 for receiving power from a source remote from the probe assembly, for receiving a calibration signal from switch 40 (FIGS. 1 and 2) which may also be located remotely of the probe assembly, and for connection of terminal block 104 (FIG. 3) to external circuitry. An externally threaded nipple 124 projects integrally from one wall of housing 120. Telescopically received within nipple 124 is a probe sub-assembly comprising probe conductor 18 in the form of a solid metal rod, a hollow tubular guard shield 26 received over rod 18 and disposed intermediate the ends of rod 18, and insulating material 126 surrounding rod 18 and separating rod 18 from shield 26. The ends of probe rod 18 and shield 26 remote from nipple 124 are exposed—i.e., not covered by insulating material. An externally threaded adapter 130 is received within nipple 124 and sealingly captures therein a conical shoulder 128 integrally formed of insulating material 126.

The exposed portion of adapter 130 is externally threaded so as to be adapted to be received within an internally threaded gland disposed at desired positions on the material vessel so that probe rod 18 and guard shield 26 project internally of the vessel as shown schematically in FIG. 1. As shown in FIG. 6, guard shield 126 terminates within insulating material 126 at a position spaced from shoulder 128 and has soldered or otherwise connected thereto an insulated conductor 132. Conductor 132 is spirally wound around rod 18 or otherwise physically attached thereto, and extends into housing 120 for connection to amplifier 24 (FIG. 1). Likewise, a conductor 134 is fastened interiorly of housing 122 to probe rod 18 for connection to resonant circuit 14 (FIG. 1). Preferably, rod 18, guard shield 26, insulating material 126 and conductor 132 are formed as a sub-assembly by fixturing guard shield 26 with respect to rod 18 and then injection molding insulating material 126 around the guard shield and probe rod. An insulating washer 136 may be positioned between rod 18 and guard shield 26 to facilitate such fixturing.

The several embodiments of the invention exhibit a number of significant advantages over prior art devices of similar type. For example, responsiveness of the material level detection circuitry to phase angle of the probe signal rather than to amplitude thereof renders the level detection circuitry substantially unresponsive to variations in conductivity of the material caused by varying moisture content, etc. All embodiments may be readily recalibrated at any time by an operator by merely depressing switch 40 (FIGS. 1 and 2) and holding the switch depressed until LED 60 (FIG. 2) illuminates. The indicators may be manufactured to be identical at the factory and modified to suit particular applications in the field by removing one or more jumpers 76, 78, 84, 86 according to prespecified factory directions. This feature reduces the number of models which must be stocked by a distributor.

It will be appreciated that the invention is susceptible to a number of modifications and variations in addition to those hereinabove described in detail. For example, although automatic calibration in accordance with the embodiments of FIGS. 2, 4 and 5 is presently preferred, manual calibration may be provided in accordance with the present invention in its broadest aspects by providing a manually adjustable capacitance and/or inductance in the parallel resonance circuit, or by providing for manual adjustment of the reference resistor 56 in a manner analogous to the automatic adjustment embodiment of FIG. 4.

The systems of FIGS. 1–5, and the principles embodied therein, are the subjects of concurrently filed application Ser. Nos. 411,527 and 411,525 assigned to the assignee hereof.

The invention claimed is:

1. A method of constructing a capacitance probe for a level indicating system comprising the steps of: (a) providing a solid probe rod, (b) fixturing a hollow tubular guard telescopically surrounding and radially spaced from said probe rod intermediate and spaced from opposing ends of said probe rod, (c) connecting an insulated electrical wire to said guard and affixing said wire to said probe rod so as to extend at least to one end of said rod, (d) injection molding insulation material in a one-piece unitary construction surrounding said probe rod and between said probe rod and said guard and radially surrounding one end of said guard, a portion of said probe rod and at least a portion of said guard remote from said one end being exposed, and (e) mounting the molded assembly within a nipple adapted for mounting the assembly to a material vessel.

2. The method set forth in claim 1 wherein said step (d) comprises the step of forming a lip of, and integrally with, said insulating material around said probe rod intermediate said guard and said one end, and wherein said step (e) comprises the step of sealingly capturing said lip within said nipple.

* * * * *